United States Patent [19]

Scarrá

[11] Patent Number: 5,657,484

[45] Date of Patent: Aug. 12, 1997

[54] METHOD FOR CARRYING OUT A BOOLEAN OPERATION BETWEEN ANY TWO BITS OF ANY TWO REGISTERS

[75] Inventor: Flavio Scarrá, Agrate Brianza, Italy

[73] Assignee: SGS-Thomson Microelectronics s.r.l., Italy

[21] Appl. No.: 364,505

[22] Filed: Dec. 27, 1994

Related U.S. Application Data

[63] Continuation of Ser. No. 15,307, Feb. 9, 1993, abandoned, which is a continuation of Ser. No. 690,495, Apr. 24, 1991, abandoned.

[30] Foreign Application Priority Data

Apr. 26, 1990 [IT] Italy ................. 83617A/90

[51] Int. Cl.$^6$ ................. G06F 9/305; G06F 9/312
[52] U.S. Cl. ................. 395/561; 364/259; 364/200.2; 364/244.5; 395/562; 395/564
[58] Field of Search ................. 371/21.2, 21.3; 395/375, 482–483, 493, 775, 800, 182.01, 182.03

[56] References Cited

U.S. PATENT DOCUMENTS

| | | | |
|---|---|---|---|
| 3,611,309 | 10/1971 | Zingg | 364/900 |
| 4,016,544 | 4/1977 | Morita et al. | 395/164 |
| 4,212,076 | 7/1980 | Conners | 395/375 |
| 4,314,349 | 2/1982 | Batcher | 395/800 |
| 4,331,893 | 5/1982 | Conners | 307/465 |
| 4,570,222 | 2/1986 | Ogram | 365/244 |
| 4,592,005 | 5/1986 | Kregness | 364/736 |
| 4,621,339 | 11/1986 | Wagner et al. | 395/800 |
| 4,716,541 | 12/1987 | Quatse | 395/275 |
| 4,945,472 | 7/1990 | Sawamura et al. | 395/775 |
| 4,991,086 | 2/1991 | Kojima | 395/375 |
| 5,027,354 | 6/1991 | Ara et al. | 371/25.1 |
| 5,060,136 | 10/1991 | Furney et al. | 395/425 |
| 5,060,143 | 10/1991 | Lee | 395/600 |
| 5,068,821 | 11/1991 | Sexton et al. | 395/800 |
| 5,083,267 | 1/1992 | Rau et al. | 395/375 |
| 5,101,483 | 3/1992 | Tanagawa | 395/375 |
| 5,107,415 | 4/1992 | Sato et al. | 395/800 |
| 5,125,094 | 6/1992 | Kyuma | 395/775 |
| 5,129,065 | 7/1992 | Priem et al. | 395/375 |
| 5,133,054 | 7/1992 | Matsumoto et al. | 395/250 |
| 5,167,029 | 11/1992 | Eikir et al. | 395/885 |
| 5,457,803 | 10/1995 | Sato et al. | 395/775 |

OTHER PUBLICATIONS

Harman, T.L. et al. The Motorola MC68000 Microprocessor Family: Assembly Language, Interface Design, and System Design, 1985, p. 407.

Tanenbaum, A.S. Structured Computer Organization (2d ed.). 1984, p. 235.

*Primary Examiner*—Lance Leonard Barry
*Attorney, Agent, or Firm*—Felsman, Bradley, Gunter & Dillon, LLP

[57] ABSTRACT

A method for loading the content of any selected cell of a source register to any selected cell of a destination register. The value in the selected source cell is tested for a value of zero. The value of the destination register is then copied into a temporary register. During the copying, the selected destination cell is set to a selected value. The selected destination cell, in the temporary location, is either left unchanged or reset to a complementary value depending on the result of the previous zero test. In either event, the value of the temporary register is then copied to the destination register.

4 Claims, 1 Drawing Sheet

METHOD FOR CARRYING OUT A BOOLEAN OPERATION BETWEEN ANY TWO BITS OF ANY TWO REGISTERS

This is a continuation of application Ser. No. 08/015,307, filed Feb. 9, 1993, abandoned, which is a continuation of application Ser. No. 07/690,495, filed Apr. 24, 1991, abandoned.

BACKGROUND OF THE INVENTION (1) Field of the Invention

The present invention relates to a novel method for carrying out logic (boolean) operations between two bits stored respectively in any two registers belonging to a certain set of registers or to other physical data storage device of a microprocessor or of peripherals associated thereto.

(2) Description of the Related Art

Commonly, microprocessors are capable of performing logic operations among bits belonging to a certain limited portion of the overall physical data storage resources which are associated to the microprocessor. For this purpose a fixed register otherwise known as the "accumulator" is utilized. The resulting bit is returned to the accumulator and the operand bits are temporarily transferred there reading them from the respective registers where they reside (are permanently stored).

A drawback of these microprocessor systems is due to the necessity of effecting a large number of data transfers to and from the physical data storage resources of the microprocessor. This fact strongly limits the possibility of simulating complex logic networks in an efficient and fast manner.

SUMMARY OF THE INVENTION

It has now been found a new method which overcomes these difficulties and permits to perform logic operations between any two bits stored in any two registers of the microprocessor. This method permits to exploit the whole register addressing space and therefore to operate on a Register File as well as on available data storage resources of peripheral units which are associated with the microprocessor, whether these are physically integrated in the microprocessor chip. For example, the registers of input/output (I/O) management macrocells, the registers of special, dedicated circuit blocks for the management of external peripheral units, and registers of external peripherals can be used.

The method of the present invention expands the flexibility of the microprocessor so as to be able to consider it as a true boolean processor capable of simulating complex logic networks in an efficient and fast way. The method of the invention is implemented by means of a defined number of steps which may be controlled through a set of standard instructions (in Assembler language) having a perfect orthogonality in the "address space" of all the physical data storage resources belonging to and/or associated with the microprocessor.

BRIEF DESCRIPTION OF THE DRAWINGS

In the accompanying drawings.

DESCRIPTION OF A PREFERRED EMBODIMENT OF THE INVENTION

Figure 1:
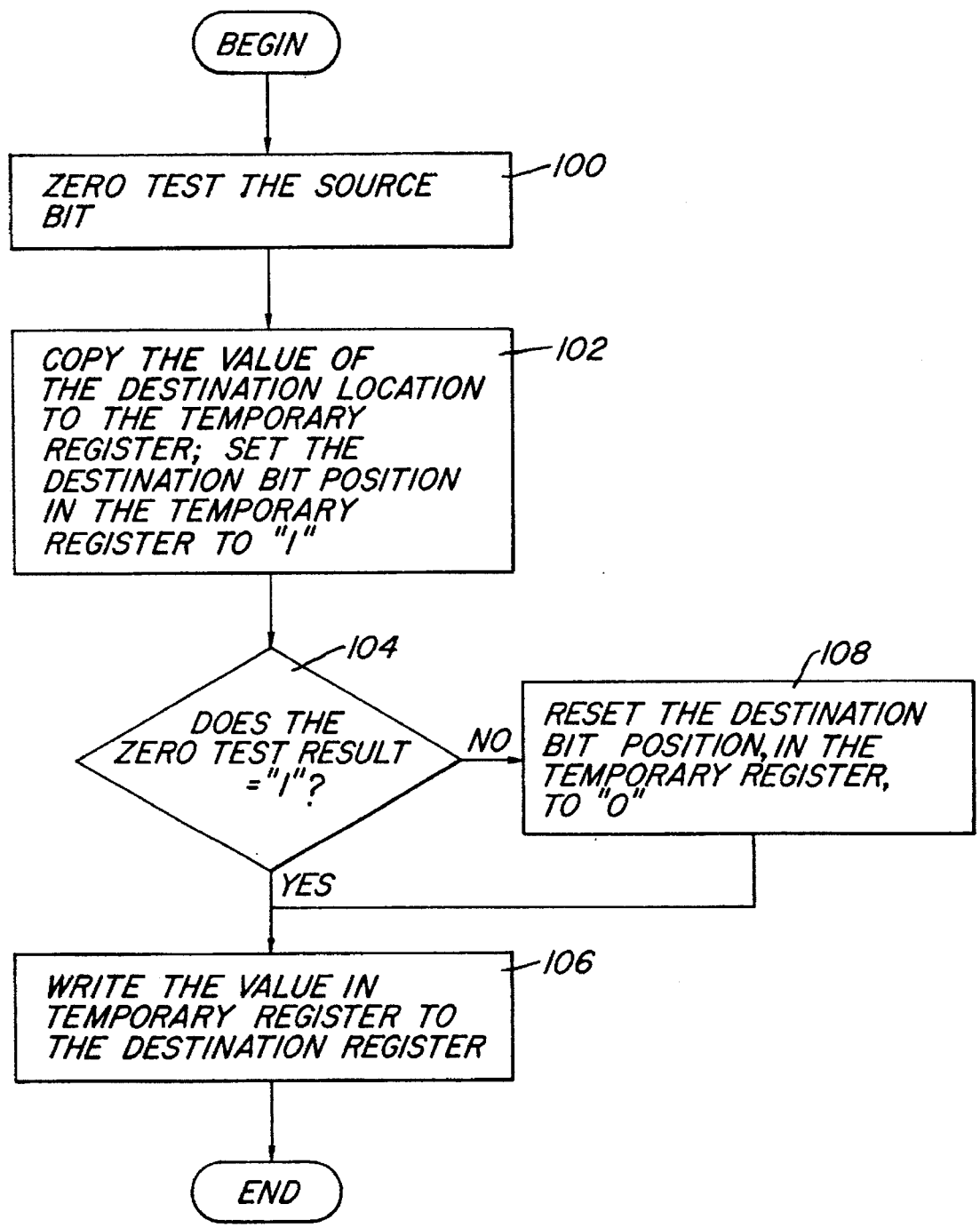
FIG. 1 is a flowchart illustrating the BIT LOAD operation.

The method of the instant invention is characterized by comprising at least one of the following steps or any combination thereof. The following short descriptions define the functions of the new instructions, and the preferred method for accomplishing these instructions is described in detail below.

1. Selecting a first bit (j), in a first source register ($r_s$) and a second bit (i) in a second, destination register ($r_d$); placing said first bit in a logic XOR with said second bit and writing the resulting bit into the position occupied by said second bit in said second, destination register, without altering the other bits present in said destination register. First bit (j) and second bit (i) need not be the same bit position. For example, the 3rd bit position in the source register can be XORed with the 7th bit position in the destination register, with the result being written into the 7th bit position of the destination register.

This step may be performed by means of the following instruction:

BXOR $r_d i, r_s j$

2. Selecting a first bit (j) in a first, source register ($r_s$); generating the complementary bit of said first bit; placing said complementary bit of said first bit in a logic XOR with a second bit (i) selected from the bits stored in a second, .destination register ($r_d$) and writing the resulting bit in the position occupied by said second bit in said second destination register, without altering the other bits stored in said destination register.

This step may be performed by means of the following instruction:

BXOR $r_d i, !r_s j$

3. Selecting a first bit (j) in a first, source register ($r_s$) and a second bit (i) in a second, destination register ($r_d$), placing said first bit in a logic AND with said second bit and writing the resulting bit in the position occupied by said second bit in said second destination register, without altering the other bits stored in said destination register.

This step may be performed by means of the following instruction:

BAND &o $r_d i, r_s j$

4. Selecting a first bit (j) in a first, source register ($r_s$) and a second bit (i) in a second, destination register ($r_d$), generating a complementary bit of said first bit and placing said complementary bit in a logic AND with said second bit and writing the resulting bit in the position occupied by said second bit in said second destination register, without altering the other bits stored in said destination register.

This step may be performed by means of the following instruction:

BAND $r_d i, !r_s j$

5. Selecting a first bit (j) in a first, source register ($r_s$) and a second bit (i) in a second, destination register ($r_d$), placing said first bit in a logic OR with said second bit and writing the resulting bit in the position occupied by said second bit in said second destination register, without altering the other bits stored in said destination register.

This operation may be performed by means of the following instruction:

BOR $r_di,r_sj$

6. Selecting a first bit (j) in a first, source register ($r_s$) and a seocnd bit (i) in a second, destination register ($r_d$), generating a complementary bit of said first bit and placing said complementary bit in a logic OR with said second bit and writing the resulting bit in the position occupied by said second bit in said second destination register, without altering the other bits stored in said destination register.

This step may be performed by means of the following instruction:

BOR $r_di, !r_sj$

7. Selecting a first bit (j) in a first, source register ($r_s$), and writing said first bit in the position occupied by a second bit (i) selected in a second, destination register ($r_d$), without altering the other bits stored in said second destination register.

This operation may be performed by means of the following instruction:

BLD $r_di,r_sj$

8. Selecting a first bit (j) in a first, source register ($r_s$), generating a complementary bit of said first selected bit and writing said complementary bit in the position occupied by a second selected bit (i) in a second, destination register ($r_d$), without altering the other bits stored in said destination register.

This step may be performed by means of the following instruction:

BLD $r_di,!r_sj$

Operations 1–6 defined above are described below in the section titled BIT OPERATIONS, while operations 7 and 8 are defined in the section titled BIT LOAD. Basically the permitted logic operations of the above collection are the following:

| I | XOR | J; | I | XOR | J̄; |
| I | AND | J; | I | AND | J̄; |
| I | OR | J; | I | OR | J̄; |
| I | ← | J; | I | ← | J̄. |

Of course the register pointing techniques used for addressing the source and the destination registers may be any known techniques which is customarily used for this purpose in state-of-the-art microprocessors.

The method of the invention can be carried out with the hardware present in any state-of-the-art microprocessor, which is normally provided with the hardware for carrying out Set/Reset operations of any selected bit (BSET and BRES). In practice, the method of the invention is implemented by carrying out Set/Reset operations on a selected bit of a destination register as a function of the type of logic operator (OR, AND or XOR) and of the value of a selected bit of a source register. In other words, the above-described logic operations between any two bits belonging respectively to a source register and to a destination register are performed by manipulating the selected bit in the destination register as a function of certain parameters which are determined by the type of logic operator and by the value of the selected bit of the source register.

BIT OPERATION

In accordance with the method of the invention, the basic six standard instructions: BSET, BRES, BCPL, BOR, BAND and BXOR, are all carried out by following a somewhat similar flow, notwithstanding the fact the last three instructions imply the performance of a boolean operation between two operands as compared to the first three instructions which concern a single operand. The first three instructions: BSET, BRES and BCPL, can be discriminated from the other three instructions because the fourth bit of the second byte of the relative OPCODE is equal to "0". These first three operations (BSET, BRES and BCPL) are performed through a commonly used parametric technique by which a logic OR, AND or XOR operation between the byte containing the bit to be modified and an appropriate constant is carried out. The constant is automatically generated by decoding the bits 5, 6, and 7 of the second byte of the instruction's OPCODE. The selected constant is always constituted by seven "1" and one "0" and is loaded in a direct form or in a complementary form depending on the type of operation to be performed, e.g. in its direct form if a Reset is performed or in its complementary form if a Set is performed.

This method of executing the first three instructions is customary and does not imply any particular difficulty. By contrast, the known methods for performing the other three boolean operations (BOR, BAND and BXOR) between selected bits, as well as the so-called Bit Load operation (BLD), have drawbacks as mentioned in the preamble of this specification.

The instructions for executing the above mentioned three boolean operations between any two selected bits (two operands) are easily recognized because the fourth bit of the second byte of these instructions, expressed in the same OPCODE, is equal to "1", while for the first three operations was equal "0".

In accordance with the method of the present invention, for carrying out a generic operation involving an operator chosen among OR, AND and XOR logic operators, between any selected bit of any source register and any selected bit of any destination register, the following procedure is followed.

Firstly, by following a flow similar to the flow followed for executing the above-identified first three basic instructions: BSET, BRES and BCPL, a certain Set/Reset operation on the bit which has been selected as the destination bit is performed and the resulting modified data is saved to a temporary storage register, according to the following scheme:

a Set operation for an OR operation;

a Reset operation for an AND operation; and a complement generation operation for an XOR operation.

Subsequently, the bit which has been selected as the source bit in the source register is tested by means of a pair of standard instructions: FORCE TEST and SET ALU C, which permit to the ALU to perform an AND operation with a constant formed by seven "0" and one "1" and to carry out a ZERO TEST on the result.

The result of this test is elaborated by the parametric evaluation circuitry of the microprocessor and is utilized by the CPU for selecting one of two possible flow paths. One path stores the modified data in the destination register and the other path leads to a nonaction.

The method of the invention will be illustrated now through a series of specific examples.

BOR: between the third bit of the data F0h (destination byte) and the first bit of the data 0Fh (source byte);

carrying out a Set operation on the third bit of the destination data F0h and storing the resulting data in a temporary storage register, as F8H;

performing a ZERO TEST on the source bit 1 of the source data 0Fh;

if the result of the ZERO TEST on the source bit is equal to "1", then the modified data F8h is saved to the destination register, thus completing the BOR operation.

BAND: between the third bit of the data FFh (destination byte) and the first bit of the data 00h (source byte);

carrying out a Reset operation on the third bit of the destination data FFh and storing the resulting data in a temporary storage register, as F7h;

performing a ZERO TEST on the source bit 1 of the source data 00h;

if the result of the ZERO TEST on the source bit is equal to "0", then the modified data F7h is saved to the destination register, thus completing the BAND operation.

BXOR: between the third bit of the data F0h (destination byte) and the first bit of the data 0Fh (source byte).

generating the complement of the third bit of the destination data F0h and storing the resulting data in a temporary storage register, as F8h;

performing a ZERO TEST on the source bit 1 of the source data 0Fh;

if the result of the ZERO TEST on the source bit is equal to "1", then the temporarily stored modified data F8h is saved to the destination register, thus completing the BXOR operation.

From the above examples one notes that the saving to the destination register of the modified data placed in the temporary storage register must occur in different instances; i.e. for test bit 1="1" in execution of a BOR operation and of a BXOR operation and for test bit 1="0" in execution of a BAND operation.

In order to avoid a flow duplication, a consequent complication of the execution of the instruction and an increase of the time of execution, the result of the ZERO TEST on the source bit, may be "reversed" in function of the fourth bit of the third byte of the instruction's OPCODE. Therefore in execution of a BOR or BXOR instruction the third byte will have the fourth bit equal to "0", while in execution of a BAND instruction the fourth bit of the third byte of the OPCODE will be equal to "1".

The fourth bit of the third byte of the OPCODE is sampled every time the instruction SET ALU C is given. The peculiar construction of this standard command greatly facilitates the possibility of executing it with the source bit complemented, it will be sufficient in fact to generate the complement of the fourth bit of the third byte of the code.

BIT LOAD

In accordance with the preferred method, and as shown in FIG. 1, the BIT LOAD operation between a source bit of a source location and a destination bit of a destination location may be performed using a different approach than used for the other operations between bits. In the BIT LOAD operation, the ZERO TEST on the source bit is executed first (100), and is followed by the performance of the Set operation on the destination bit location in the temporary location (102). Next, a reset operation may be performed (108) on this bit, depending on the result of the ZERO TEST on the source bit. Finally, the result is saved to the destination location (106).

In greater detail the test (100) is carried out on the source bit by means of the usual pair of standard instructions: FORCE TEST and SET ALU C. The test is carried out first because two microinstructions are necessary before being able to utilize the result for determining whether the Reset operation is to be performed.

This technique allows the Set operation (102) to be performed on the destination bit immediately after the ZERO TEST. The result of the Set operation is saved to a temporary storage register.

In case the ZERO TEST on the source bit has given a result equal to "1", (104) the performance of a Reset operation on the destination bit is not required. In such case, the modified data contained in the temporary storage register is saved to the destination register (106).

If the result of the ZERO TEST (104) is "0", a Reset operation must be performed on the destination bit (108). This is followed by the execution of an AND operation with an appropriate constant. The selection of the constant and the parametric prearrangement may be effected conveniently through the usual two instructions: FORCE TEST and SET ALU C, which perform the ZERO TEST. An AND operation is performed with a purposely inverted constant (seven "0" and one "1"). In this way, it will be sufficient to invert the constant before carrying out the Reset on the destination bit, which may be effected by means of the pair of standard instructions: FORCE TEST and FORCE ALU SUB. If these are given simultaneously, the constant is used in its straightforward form (noninverted).

The resulting data is eventually saved to the destination register to complete the Bit Load operation.

I claim:

1. A method for copying a bit of data from a cell of a source register to a cell of a destination register, wherein the source and destination registers each comprise a plurality of cells for storing a corresponding plurality of bits of data, the method comprising the steps of:

a) selecting a cell of the source register as a source cell;

b) selecting a cell of the destination register as a destination cell;

c) comparing the content of the source cell to zero;

d) loading the contents of the destination register into a temporary register having the same number of cells as the destination register;

e) setting to one the content of the cell in the temporary register that corresponds to the destination cell of the destination register;

f) if the content of the source cell is equal to zero, resetting to zero the content of the cell of the temporary register that corresponds to the destination cell of the destination register, otherwise not changing the content of the temporary register; and g) transferring the contents of the temporary register into the destination register.

2. The method of claim 1, wherein the temporary register comprises an accumulator.

3. The method of claim 1, wherein source first cell within the source register and the destination cell within the destination register have the same relative positions within their respective registers.

4. The method of claim 1, wherein the source cell within the source register and the destination cell within the destination register have different relative positions within their respective registers.